United States Patent
Rose

(10) Patent No.: US 8,360,734 B2
(45) Date of Patent: Jan. 29, 2013

(54) METHOD FOR REPAIRING AN AIRFOIL

(75) Inventor: William M. Rose, Warren, MA (US)

(73) Assignee: United Technologies Corporation, Hartford, CT (US)

( * ) Notice: Subject to any disclaimer, the term of this patent is extended or adjusted under 35 U.S.C. 154(b) by 1433 days.

(21) Appl. No.: 11/955,695

(22) Filed: Dec. 13, 2007

(65) Prior Publication Data

US 2009/0155083 A1   Jun. 18, 2009

(51) Int. Cl.
*F01D 5/14* (2006.01)
(52) U.S. Cl. .................... 416/228; 416/241 R
(58) Field of Classification Search .......... 416/224, 416/228, 241 R; 29/889.1
See application file for complete search history.

(56) References Cited

U.S. PATENT DOCUMENTS

| | | | |
|---|---|---|---|
| 4,247,254 A | 1/1981 | Zelahy | |
| 4,390,320 A | 6/1983 | Eiswerth | |
| 4,411,597 A * | 10/1983 | Koffel et al. | 416/92 |
| 4,726,104 A | 2/1988 | Foster et al. | |
| 4,934,583 A | 6/1990 | Patsfall | |
| 5,644,394 A | 7/1997 | Owens | |
| 5,735,448 A | 4/1998 | Draghi et al. | |
| 5,794,338 A | 8/1998 | Bowden, Jr. et al. | |
| 5,822,852 A | 10/1998 | Bewlay et al. | |
| 5,846,057 A | 12/1998 | Ferrigno et al. | |
| 5,865,364 A * | 2/1999 | Trask et al. | 228/212 |
| 5,913,555 A | 6/1999 | Richter et al. | |
| 6,332,272 B1 * | 12/2001 | Sinnott et al. | 29/889.1 |
| 6,339,878 B1 * | 1/2002 | Owen et al. | 29/889.1 |
| 6,491,208 B2 * | 12/2002 | James et al. | 228/119 |
| 6,558,119 B2 | 5/2003 | Lee et al. | |
| 6,742,698 B2 | 6/2004 | Shah et al. | |
| 6,908,288 B2 | 6/2005 | Jackson et al. | |
| 7,600,977 B2 * | 10/2009 | Shadbolt et al. | 416/224 |
| 8,006,380 B2 * | 8/2011 | Rawson et al. | 29/889.1 |
| 2009/0049689 A1 * | 2/2009 | Hiskes | 29/889.1 |

FOREIGN PATENT DOCUMENTS

FR   2631268   11/1989

OTHER PUBLICATIONS

European Search Report, dated May 4, 2012, EP Application No. 08253859.6.

* cited by examiner

*Primary Examiner* — Ninh H Nguyen
(74) *Attorney, Agent, or Firm* — Carlson Gaskey & Olds P.C.

(57) ABSTRACT

An example method of repairing an airfoil includes securing a cap to an end portion of a worn airfoil and securing additional material to the cap. The method includes altering some of the cap to form a desired airfoil contour.

21 Claims, 3 Drawing Sheets

METHOD FOR REPAIRING AN AIRFOIL

BACKGROUND OF THE INVENTION

The application relates to a method of repairing a blade airfoil, wherein additional material secures to a cap secured to the blade.

Gas turbine engines are known and typically include multiple sections, such as a fan, a compression section, a combustor section, a turbine section, and an exhaust nozzle. Blades are mounted within the compressor and turbine sections. The blades have airfoils extending from a platform toward a blade tip.

Rotating blades compress air in the compression section. The compressed air mixes with fuel and is combusted in the combustor section. Products of combustion expand to rotatably drive blades in the turbine section. As the blades are often exposed to extreme temperatures, some blades, especially the turbine blades, include internal channels for routing cooling air.

Some blades rub against other portions of the engine when rotating. The engine dimensions are controlled to prevent too much rubbing, which can fracture the blade or bind the engine. Rubbing wears and stresses the blades, particularly near the blade tip. Replacing an entire worn blade is often expensive due to material and machining costs.

To prevent replacing the entire blade, the worn area is often removed and replaced with a build-up of weld material that is then machined to an appropriate airfoil shape. But other areas of the blade, such as braze material from the OEM production process, can contaminate the build-up, and as known, contaminants weaken welds.

Therefore, what is needed is a method of repairing an airfoil that lessens contaminants in the repairing weld, especially repairing welds near the tip of the airfoil.

SUMMARY OF THE INVENTION

An example method of repairing an airfoil includes securing a new cap to an end portion of a worn airfoil and securing additional material to the cap. The method includes altering some of the cap to form a desired airfoil contour. In another example, the method includes capping a worn airfoil with a cap, and then securing additional material to the cap. An example repaired blade includes a blade having an airfoil profile extending toward a blade tip and a cap securing the blade tip to the airfoil of the blade. The airfoil profile is created in the cap by consuming a portion of the cap. In one example, welding consumes a portion of the cap.

These and other features of the present invention can be best understood from the following specification and drawings, the following of which is a brief description.

DETAILED DESCRIPTION OF THE PREFERRED EMBODIMENT

Figure 1:
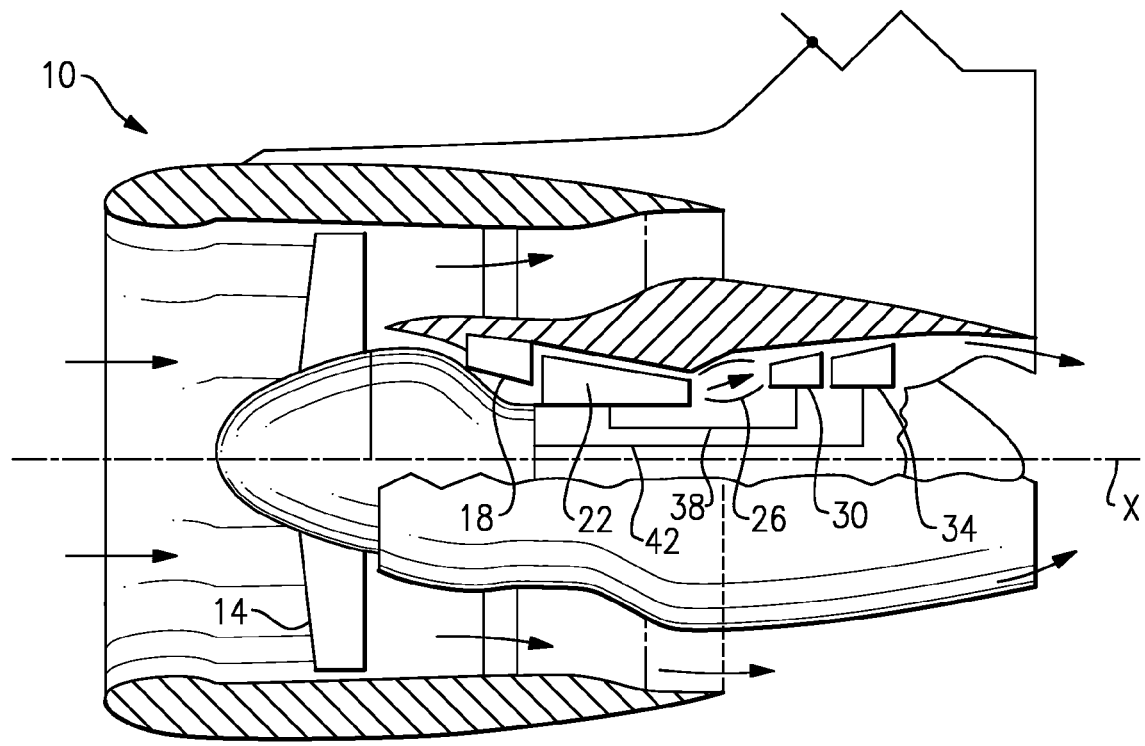
FIG. 1 schematically shows an example gas turbine engine.

FIG. 1 schematically illustrates an example gas turbine engine 10 including (in serial flow communication) a fan section 14, a low pressure compressor 18, a high pressure compressor 22, a combustor 26, a high pressure turbine 30 and a low pressure turbine 34. The gas turbine engine 10 is circumferentially disposed about an engine centerline X. During operation, air is pulled into the gas turbine engine 10 by the fan section 14, pressurized by the compressors 18, 22, mixed with fuel, and burned in the combustor 26. The high and low pressure turbines 30, 34, extract energy from the hot combustion gases flowing from the combustor 26.

In a two-spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power the low pressure compressor 18 and the fan section 14 through a low speed shaft 42. However, the invention is not limited to the two-spool gas turbine architecture described and may be used with other architectures such as a single-spool axial design, a three-spool axial design and other architectures. That is, there are various types of gas turbine engines, many of which could benefit from the examples disclosed herein, which are not limited to the design shown.

Figure 2:
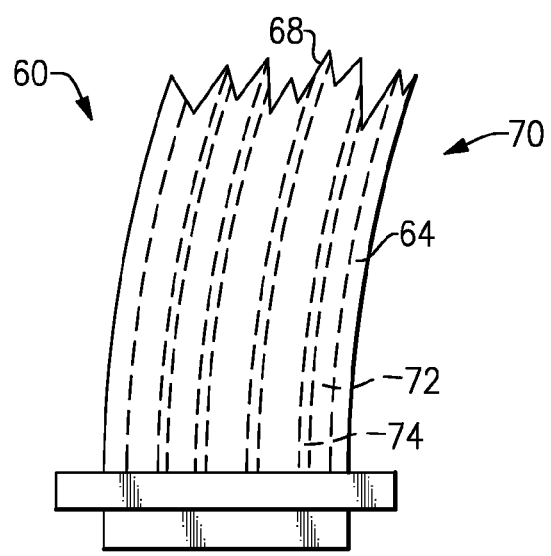
FIG. 2 shows a worn blade of the FIG. 1 engine.

Referring now to FIG. 2, a worn turbine blade 60 within the high pressure turbine 30 of FIG. 1 includes an airfoil profile 64 extending toward a tip portion 68. The blade 60 includes a worn area 70 at the tip portion 68. A blade core 72 with one or more strengthening ribs 74 extends through the interior of the blade 60. As known, air moves through the blade core 72 to cool the blade 60. Also as known, stresses from rubbing the blade 60 within the engine 10 wear the tip portion 68. Although shown as a turbine blade 60, it should be understood that other examples may include a compressor blade.

Figure 3:
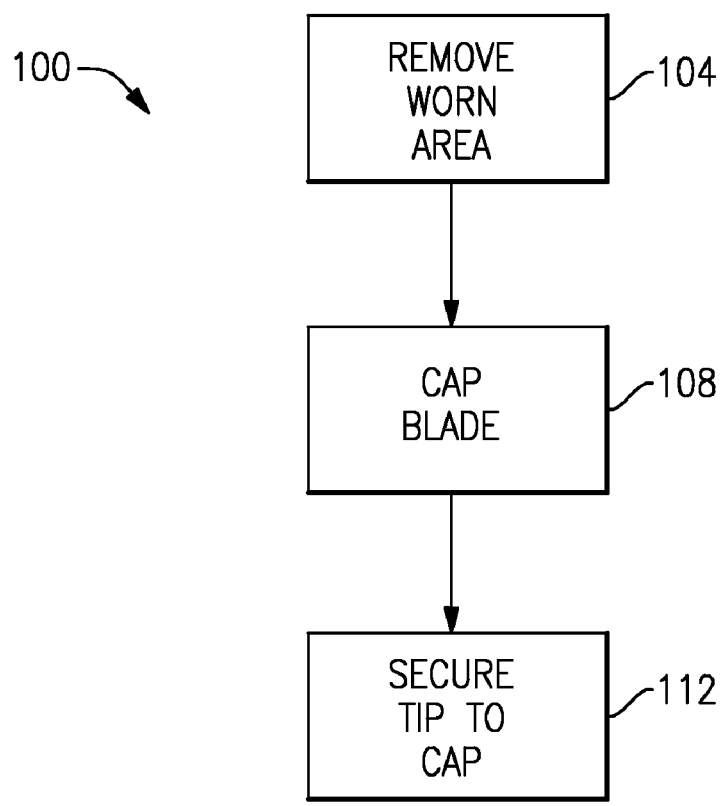
FIG. 3 shows the flow of an example method for repairing the FIG. 2 blade.

As shown in FIG. 3, an example method 100 for repairing the blade 60 of FIG. 2 includes removing the worn area 70 at step 104, which exposes the blade core 72 and the ribs 74. The method 100 next caps the blade 60 and exposed blade core 72 at step 108. The tip portion 82 is then welded to the capped blade at step 112.

Figure 5:
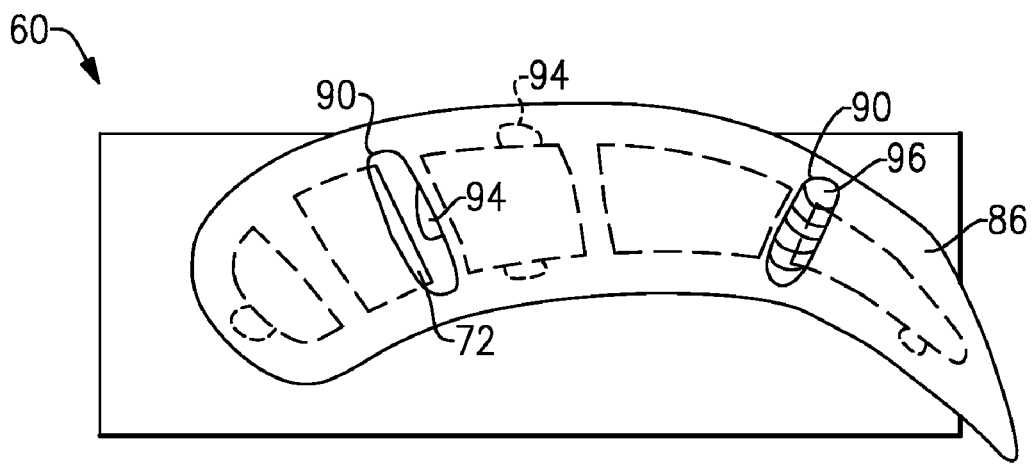
FIG. 5 shows an end view of the FIG. 4 blade.
Figure 4:
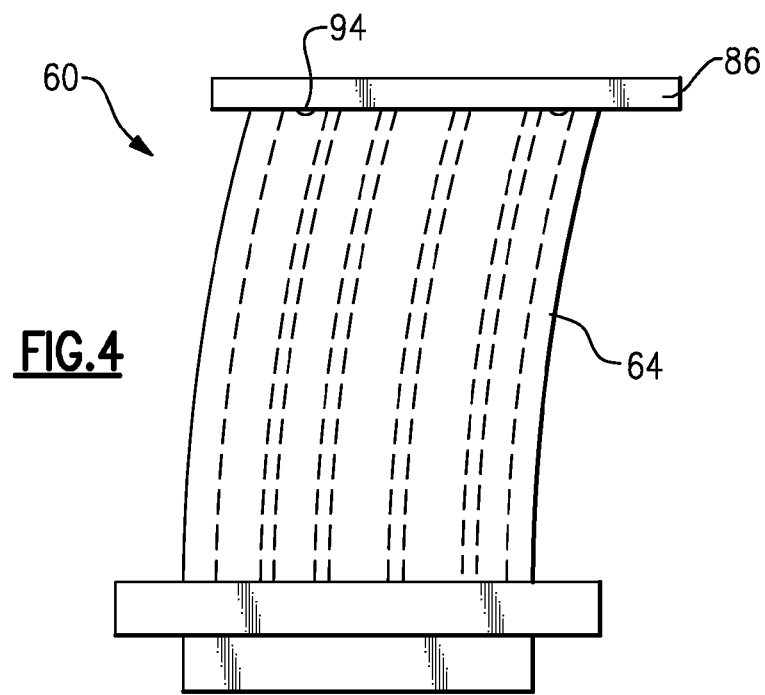
FIG. 4 shows the FIG. 2 blade during repair.

Referring now to the FIGS. 4 and 5, a cap 86 is welded to the blade 60. Prior to welding, the cap 86 extends past the airfoil 64 about 0.01-0.06 inches (0.25-1.27 millimeters), and, in one example, the cap 86 extends about 0.03-0.04 inches (0.76-1.02 millimeters) proud of the airfoil 64. The cap 86 is initially secured to the blade 60, with plug welds 94, for example. The blade core 72 is accessible through at least one aperture 90 within the cap 86. The aperture 90 facilitates weldably securing the cap 86 to the blade 60.

After initially securing the cap 86 using the plug welds 94, additional welding, such as fusion welding, fills the aperture 90 with weld material 96 and seals the blade core 72. The plug welds 94 maintain the position of the cap 86 relative to the blade 60 when sealing the blade core 72. In this example, sealing the blade core 72 limits movement of residual braze from the blade core 72 past the cap 86, which lessens the chance of contaminating further welds near the cap 86 with the residual braze from the blade core 72. Thus, capping and sealing inhibits movement of contaminants from the blade core 72 to higher stress areas of the blade 60.

Figure 6:
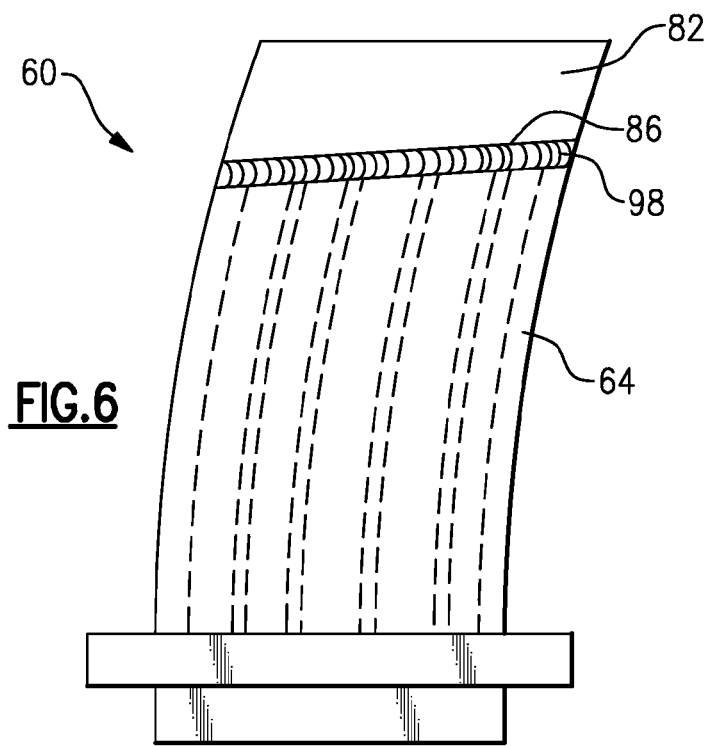
FIG. 6 shows the repaired FIG. 2 blade.

FIG. 6 shows the repaired blade 60 with a weld 98 securing a tip portion 82 to the cap 86, which is consumed as filler in the weld 98. In this example, the tip portion 82 is a cast or machined virgin nickel super alloy material, such as Rene' 80, and not entirely weld build-up. The blade 60 and the cap 86 are also Rene' 80 in this example.

Gas tungsten arc welding or fusion welding secure the tip portion 82 to the cap 86. Some of the cap 86 is consumed as weld filler in the weld 98, which reduces the amount of the cap 86 extending past the airfoil 64. Consuming the cap 86 as weld filler in the weld 98 introduces a finite amount of weld filler to the weld 98 when welding. Because the cap 86 extends approximately evenly past the perimeter of the airfoil 64, the amount of potential weld filler is generally evenly distributed about the airfoil 64. As known, limiting weld filler lessens weld drop through into the blade core 72.

Welding may not reduce all of the cap 86 extending past the airfoil 64. Grinding or buffing the airfoil 64 may remove remaining extending portions to align the perimeters of the cap 86 and the weld 98 with the airfoil 64 and return the repaired airfoil to desired dimensions.

While a preferred embodiment of this invention has been disclosed, a worker of ordinary skill in the art would recognize that certain modifications would come within the scope of this invention. For that reason, the following claims should be studied to determine the true scope and content of this invention.

I claim:

1. A method of repairing an airfoil, comprising the steps of:
   a) securing a cap to an end portion of a worn airfoil;
   b) securing additional material to the cap; and
   c) altering some of the cap to form a desired airfoil contour.

2. The method of claim 1, wherein the cap seals an interior cavity within the airfoil.

3. The method of claim 1, wherein the cap is secured by welding.

4. The method of claim 3, including welding through an aperture in the cap.

5. The method of claim 3, including closing apertures in the cap by welding.

6. The method of claim 1, wherein the additional material is secured by welding.

7. The method of claim 1, wherein some of the cap is altered by welding.

8. The method of claim 7, wherein some of the cap is consumed as weld filler when welding.

9. The method of claim 1, wherein some of the cap extends past the desired airfoil contour.

10. The method of claim 9, wherein a perimeter edge of the cap extends about 0.76-1.02 millimeters past a perimeter edge of the desired airfoil contour.

11. The method of claim 1, wherein the airfoil is one of a turbine blade and a compressor blade.

12. The method of claim 1, wherein securing additional material to the cap forms a tip for the airfoil.

13. A method of repairing an airfoil, comprising the steps of:
    a) capping a worn airfoil with a cap; and
    b) securing additional material to the cap;
    c) forming a desired airfoil contour by removing some of the cap.

14. The method of claim 13, wherein removing includes grinding;
    d) consuming some of the cap as a weld filler during the securing.

15. The method of claim 13, wherein the removing step includes grinding.

16. A repaired blade, comprising:
    a blade having an airfoil profile extending toward a blade tip; and
    a cap securing the blade tip to other portions of the blade, wherein the airfoil profile is created in the cap by consuming a portion of the cap.

17. The blade of claim 16, wherein the cap has a larger profile prior to consuming a portion of the cap.

18. The blade of claim 17, wherein the cap extends about 0.76-1.02 millimeters past the airfoil profile prior to consuming a portion of the cap.

19. The blade of claim 16, wherein consuming a portion of the cap comprises welding the cap to the blade.

20. The blade of claim 16, wherein the blade tip comprises additional material secured to the cap.

21. The blade of claim 16, wherein the cap and the blade tip are separate structures.

* * * * *